United States Patent
Sidenstick et al.

(10) Patent No.: US 9,029,441 B2
(45) Date of Patent: May 12, 2015

(54) LOW TOXICITY SOLVENT SYSTEM FOR POLYAMIDEIMIDE AND POLYAMIDE AMIC ACID RESINS AND COATING SOLUTIONS THEREOF

(71) Applicants: John Sidenstick, Newport, TN (US); Russell Scott Clouston, Warwick, NY (US); Kathryn Mullins, Soddy Daisy, TN (US)

(72) Inventors: John Sidenstick, Newport, TN (US); Russell Scott Clouston, Warwick, NY (US); Kathryn Mullins, Soddy Daisy, TN (US)

(73) Assignee: Fujifilm Hunt Chemicals US, Inc., Allendale, NJ (US)

( * ) Notice: Subject to any disclaimer, the term of this patent is extended or adjusted under 35 U.S.C. 154(b) by 64 days.

(21) Appl. No.: 13/842,697

(22) Filed: Mar. 15, 2013

(65) Prior Publication Data
US 2013/0217812 A1    Aug. 22, 2013

Related U.S. Application Data

(63) Continuation-in-part of application No. PCT/US2012/070192, filed on Dec. 17, 2012.

(60) Provisional application No. 61/576,247, filed on Dec. 15, 2011.

(51) Int. Cl.
| | |
|---|---|
| C08K 5/20 | (2006.01) |
| C08K 5/35 | (2006.01) |
| C08K 5/3462 | (2006.01) |
| C09D 7/00 | (2006.01) |
| C08G 73/14 | (2006.01) |
| C09D 179/08 | (2006.01) |

(52) U.S. Cl.
CPC ............... *C09D 7/001* (2013.01); *C08G 73/14* (2013.01); *C09D 179/08* (2013.01)

(58) Field of Classification Search
CPC ....... C09D 179/08; C09D 7/001; C08G 73/14
USPC ............................................ 524/96, 100, 233
See application file for complete search history.

(56) References Cited

U.S. PATENT DOCUMENTS

| | | | |
|---|---|---|---|
| 3,346,502 A | 10/1967 | Wixon | |
| 3,393,153 A | 7/1968 | Zimmerer et al. | |
| 3,463,764 A | 8/1969 | Hopwood et al. | |
| 3,646,015 A | 2/1972 | Hamilton | |
| 3,650,752 A | 3/1972 | Amano et al. | |
| 3,666,470 A | 5/1972 | Tsuji et al. | |
| 3,779,766 A | 12/1973 | Tsuji et al. | |
| 3,939,109 A | 2/1976 | Barie, Jr. et al. | |
| 4,098,775 A | 7/1978 | Onder | |
| 4,408,032 A | 10/1983 | Sollner et al. | |
| 4,428,978 A | 1/1984 | Jabs et al. | |
| 4,950,700 A | 8/1990 | Balme et al. | |
| 5,103,326 A | 4/1992 | Fergason | |
| 5,756,647 A | 5/1998 | Schmid et al. | |
| 5,948,607 A | 9/1999 | Uchida et al. | |
| 6,319,291 B1 | 11/2001 | Pedemonte | |
| 7,011,922 B2 | 3/2006 | Minami et al. | |
| 7,410,744 B2 | 8/2008 | Watanabe et al. | |
| 2003/0060387 A1 | 3/2003 | Hsu et al. | |
| 2005/0043502 A1 | 2/2005 | Hikita et al. | |
| 2007/0098900 A1 | 5/2007 | Abe et al. | |
| 2007/0254138 A1 | 11/2007 | Remmer | |
| 2009/0208868 A1 | 8/2009 | Okazaki et al. | |
| 2013/0217812 A1 | 8/2013 | Sidenstick et al. | |

FOREIGN PATENT DOCUMENTS

| | | |
|---|---|---|
| WO | 02/078970 A1 | 10/2002 |
| WO | 2007/014847 A1 | 2/2007 |

OTHER PUBLICATIONS

International Search Report mailed Mar. 29, 2013 for PCT/US2012/070192, filed Dec. 17, 2012, 4 pages.
Written Opinion of the International Searching Authority mailed Mar. 29, 2013 for PCT/US2012/070192, filed Dec. 17, 2012, 5 pages.
PCT/US2014/015610 Notification of Transmittal of the International Search Report and the Written Opinion of the International Searching Authority, or the Declaration, mailed May 12, 2014, 10 pages.
Related PCT Patent Application No. PCT/US2014/014949 Notification of Transmittal of the International Search Report and the Written Opinion of the International Searching Authority, or the Declaration, mailed May 7, 2014, 11 pages.
Office Action from Related U.S. Appl. No. 13/761,051, mailed Jun. 18, 2014, 8 pages.

*Primary Examiner* — Kriellion Sanders

(74) *Attorney, Agent, or Firm* — Blakely, Sokoloff, Taylor & Zafman LLP

(57) ABSTRACT

Disclosed is a low toxicity aprotic alkyl amide solvent system used for the dissolution and application of polyamideimide and polyamide amic acid polymer resins. The solvent system can be used for the dissolution of polyamideimide and polyamide amic acid resins as an efficient method for incorporating these resins into functional coating compositions with the use of the solvent system.

10 Claims, 1 Drawing Sheet

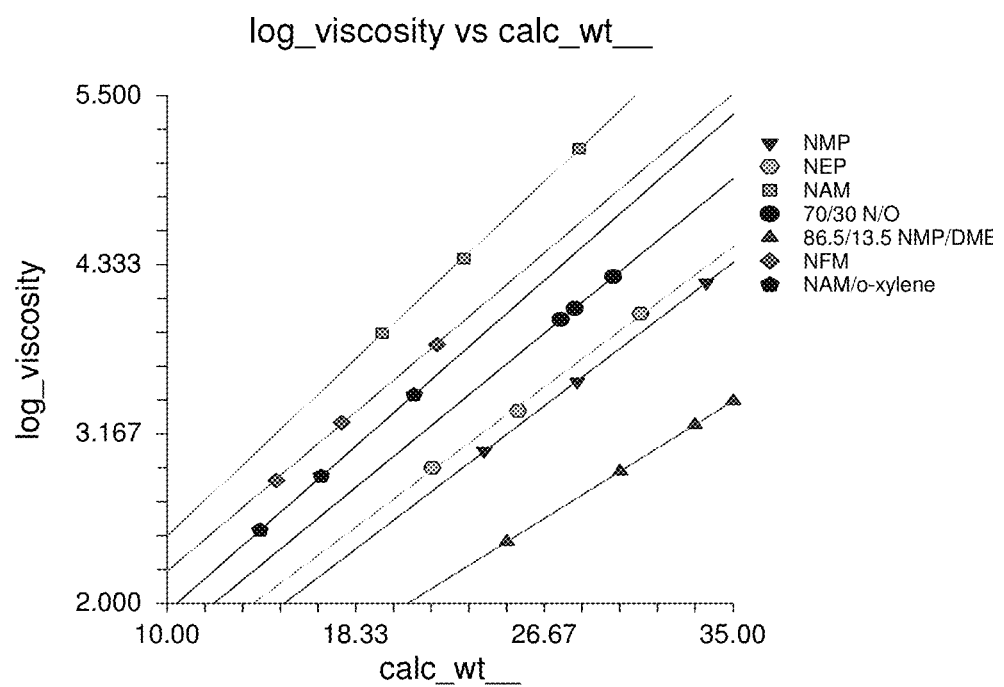

LOW TOXICITY SOLVENT SYSTEM FOR POLYAMIDEIMIDE AND POLYAMIDE AMIC ACID RESINS AND COATING SOLUTIONS THEREOF

PRIORITY

The present patent application claims priority to and incorporates by reference PCT Application No. PCT/U.S.2012/070192, titled "Low Toxicity Solvent System for Polyamideimide Resins and Solvent System Manufacture", filed Dec. 17, 2012, which claims priority to the corresponding provisional patent application Ser. No. 61/576,247, titled, "Low Toxicity Solvent System for Polyamidimide Resins and Solvent System Manufacture," filed on Dec. 15, 2011.

FIELD OF THE INVENTION

Embodiments of the present invention relate to the field of solvents; more particularly, embodiments of the present invention relate to solvents and their use in producing polyamideimide.

BACKGROUND OF THE INVENTION

Polyamideimide (PAI) polymer resins are incorporated into compositions used for many high-performance industrial coating applications due to their excellent temperature resistance and high strength. The PAI polymer resin compositions are well known in the literature, for example as described in U.S. Pat. No. 3,494,890 and GB 570,858. One of the primary routes to synthesizing polyamideimide polymers in a form that is convenient for the manufacture and formulation of these coating compositions is by reacting diisocyanate, often 4,4'-methylene diphenyldiisocyanate (MDI) with trimellitic anhydride (TMA). In this process, PAI polymers are typically synthesized in polar aprotic solvents such as N-methyl amide compounds including dimethylformamide, dimethylacetamide, N-methylpyrrolidone (NMP), N-ethylpyrrolidone. See for example U.S. Pat. No. 2,421,021, U.S. Pat. No. 3,260,691, U.S. Pat. No. 3,471,444, U.S. Pat. No. 3,518,230, U.S. Pat. No. 3,817,926, and U.S. Pat. No. 3,847,878.

Alternative solvents such as tetrahydrofuran (THF), methylethyl ketone (MEK), gamma butyrl lactone (GBL), or dimethylsulfoxide (DMSO) have drawbacks such as boiling points which are too low for use as reaction solvent, low polymer resin solubility, or poor storage stability, which may change the performance of the polymer in the application for which it is to be used.

U.S. 2012/065296A1 claims the use of gamma-butyrolactone and cyclopentanone to dissolve the PAI polymer resin to form a coating composition. U.S. Pat. No. 4,950,700 and U.S. Pat. No. 5,095,070 recite examples of gamma-butyrolactone with N-methylamide co-solvents and dimethylol ethylene urea as replacement solvents to synthesize PAI resin. However gamma-butyrolactone has neurological properties that make it subject to regulation and unsuitable for general use in formulations. Dimethylol ethylene urea has not had extensive toxicological studies performed and contains an N-methylamide functionality suspected of negative environmental and health impacts. New solvents, such as those described in U.S.20100076223A1, for example 3-methoxy-N, N-dimethylpropionamide, may be too expensive for practical industrial use or have not been fully tested for long term toxicity.

The typical polymer solids level achieved in these synthetic routes is 35-45% which may be diluted further with solvents or diluents depending on the end-use coating application. These diluents for end-use coating compositions can be either those used in the synthesis reaction to form the polymer resin itself, or other applicable and appropriate solvents which allow the polymer resins to dissolve in, and allow useful preparation of, the end coating compositions. Further, the end coating compositions which are used in such industrial applications as cookware, can coating, and wire coating use a combination of other components which require one or more solvents as diluents of both the PAI, which is typically used as a dispersing polymer, as well as other dispersing polymers, such as polyimides, polysulfones, and polyethersulfones, the primary functional components such as fluorocarbon or other polymers, plus processing aids, additives, fillers, pigments, viscosity adjusting agents, and the like. See for example, U.S. Pat. No. 4,014,834, U.S. Pat. No. 4,259,221, and U.S. Pat. No. 7,858,188. Coating compositions for cookware are described in detail in "Fluorinated Coatings and Finishes Handbook: The Definitive User's Guide", Laurence W. McKeen, William Andrew Publishing, 2007 and are well know to those skilled in the art.

On a practical level, the polymer solvents known in the art, while they may be useful for either manufacturing PAI or as a solvent in the end-use coating compositions containing PAI and other components, are also recognized for having toxicity concerns. Thus it is an advantage to use solvents for polyamideimide polymers with minimal health and safety impact.

SUMMARY OF THE INVENTION

In an effort to achieve safer, practical alternatives to the solvents of polyamideimide and polyamide amic acid polymer resins currently known by those skilled in the art, in particular a composition free of the commonly-used N-methyl amide solvents, alternative lower toxicity solvents are necessary. The solvents described in association with one or more embodiments of the present invention include acetamides due to their relatively low toxicity as well as easy preparation from industrially available dialkyl amines, with a long history of low chronic toxicity. In particular, dialkylamides are useful.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a graph depicting log of viscosity as a function of calculated weight.

DETAILED DESCRIPTION OF THE PRESENT INVENTION

The following detailed description illustrates embodiments of the invention by way of example and not by way of limitation. This description will clearly enable one skilled in the art to make and use embodiments of the invention, and describes several adaptations, variations, alternatives and uses of the invention, including what we presently believe is the best mode of carrying out embodiments of the invention. As various changes could be made in the above constructions without departing from the scope of embodiments of the invention, it is intended that all matter contained in the above description or shown in the accompanying drawings shall be interpreted as illustrative and not in a limiting sense.

The coating compositions described in association with embodiments of the present invention are based on polyamideimides and polyamide amic acid polymer resins. As an example of the preparation of the polyamideimide resins in accordance with one embodiment of the invention, a carboxylic anhydride and an organic primary amine are reacted together to form an amideimide prepolymer, there being reacted with the prepolymer a polyisocyanate to produce a relatively high molecular weight block polymer which in solution affords the desirable film-forming and other characteristics inherent in polyamideimides.

Any of a number of carboxylic anhydrides can be used in making polyamideimides including, but not limited to, the following, among others, which will occur to those skilled in the art: trimellitic anhydride; 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3',4-tricarboxylic anhydride; 3,4,10-perylene tricarboxylic anhydride; 3,4-dicarboxyphenyl 3-carboxyphenyl ether anhydride; ethylene tricarboxylic anhydride; 1,2,5-naphthalene tricarboxylic anhydride, etc. The tricarboxylic acid materials can be characterized by the following formula:

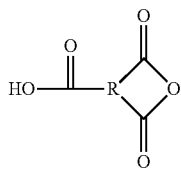

where R is a trivalent organic radical.

Useful polyamines are well known and may be expressed by the formula

X—R''—(NH$_2$)$_n$ where R'' is an organic radical and n is at least 2 and X is hydrogen, an amino group or organic group including those also containing at least one amino group.

The polyamines useful in the above connection can also be expressed by the formula R'''—(NH$_2$)$_n$ where R''' is a member selected from the class including organic radicals of at least two carbon atoms (both halogenated and unhalogenated) including but not limited to, e.g., hydrocarbon radicals of up to 40 carbon atoms, and groups including at least two aryl residues attached to each other through the medium of a member such as, but not limited to, an alkylene radical of from 1 to 10 carbon atoms, —S—, —SO.sub.2—,

or —O—, etc., and n is at least 2.

Among the specific useful amines, alone or in admixture, are the following:
p-xylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H$_2$N(CH$_2$)$_3$O(CH$_2$)$_2$O(CH$_2$)$_3$NH$_2$
H$_2$N(CH$_2$)$_3$S(CH$_2$)$_3$NH$_2$
H$_2$N(CH$_2$)$_3$N(CH$_3$)(CH$_2$)$_3$NH$_2$
meta-phenylene diamine
para-phenylene diamine
4,4'-diamino-diphenyl propane
4,4'-diamino-diphenyl methane benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
polymethylene polyaniline Any polyisocyanate, that is, any isocyanate having two or more isocyanate groups, whether blocked or unblocked, can be used in making polyamide imides. Blocked isocyanates using as the blocking constituent phenols or alcohols, among others, can be used and in general provide a higher molecular weight final material which is advantageous as, for example, in varnishes. On the other hand, the unblocked isocyanates provide more flexible final materials. At any rate, the blocking material must be evaporated off as much as possible and there is no advantage from the purely reaction point of view to using the blocked material except as stated above. Typical of the blocked polyisocyanates is Mondur S wherein mixtures of 2,4- and 2,6-tolylene diisocyanate are reacted with trimethylol propane and blocked by esterification with phenol in the proportions of three moles of isocyanate, one mole of trimethylol propane, and three moles of phenol. In Mondur SH the isocyanate groups of mixed 2,4- and 2,6-tolylene diisocyanate are blocked by esterification with cresol. Among the specific polyisocyanates which are useful alone or in admixture are the following:
tetramethylenediisocyanate
hexamethylenediisocyanate
1,4-phenylenediisocyanate
1,3-phenylenediisocyanate
1,4-cyclohexylenediisocyanate 2,4-tolylenediisocyanate
2,5-tolylenediisocyanate
2,6-tolylenediisocyanate
3,5-tolylenediisocyanate
p-xylylenediisocyanate
m-xylylenediisocyanate
4,4'-biphenylenediisocyanate
1,1-bis-(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-diphenyldimethylmethane
1,5-naphthylenediisocyanate
1,4-naphthylenediisocyanate
o-tolidine-4,4'-diisocyanate
m-tolidine-4,4'-diisocyanate
benzophenone-4,4'-diisocyanate Generally speaking, in one exemplary embodiment, a slight molar excess of carboxylic acid anhydride and organic polyamine is heated to about 200° C. to 245° C. in an inert atmosphere and solvent as above, driving off the water formed and forming an amideimide group containing prepolymer. The polyisocyanate is then added and reacted to form a block amide-imide prepolymer of relatively high molecular weight. It can be cured as by heating to form flexible film or coatings. Alternatively, the carboxylic anhydride and organic diamine can be reacted in equimolar proportions, still providing desirable flexible films or coatings, wire enamels, paints, laminate adhesives and the like.

The normal organic solvents used for such materials can include cresols or cresylic acid, phenol, xylene, N-methylpyrrolidone, dimethylformamide, dimethyl sulfoxide, dimethylacetamide, and the like, as well as others known to those skilled in the art. In addition, the polyamideimide resins synthesized in the processes described and claimed in co-pending application PCT/U.S.12/70192 may be used.

The above preparation methods for PAI resin are exemplary only, and other methods can be used which are taught in the cited patents as well as in literature and are known to those skilled in the art.

To achieve the low toxicity resin coating compositions in the practice of embodiments of the present invention, the polyamideimide in either a powdered solid form or liquid form, as synthesized in the various reaction solvents known to the art and as described above, are mixed with aprotic dialkylamide solvents of embodiments of the invention to which there may be added relatively small amounts of organic co-solvents in certain instances to obtain clear solutions for coating use, the mixture being heated to a temperature of about 80° C. until a clear solution is obtained.

It has now been found that the dissolution of PAI in these various coating compositions can be achieved by the use of aprotic dialkylamide solvents of the invention, either alone, in combination with each other, or with the use of a co-solvent to provide a unique solvent system. In accordance with one embodiment, a preferred solvent of the invention is N-acetyl morpholine (NAM), which is a solvent of lower toxicity to those known to those skilled in the art. NAM has been found to be suitable for use in making and dissolving polyamide-imde resins. Other useful and low toxicity dialkylamide solvents of embodiments of the invention include, but are not limited to, diethyl acetamide (DEAc), di-n-propyl acetamide, N-formyl morpholine, diacetylpiperazine, N,N-diisopropylacetamide (DIPAc), di-n-butylacetamide (DIBAc), di-n-propylacetamide (DIPA), N-Acetyl Piperidine, Di-n-butyl Acetamide, or N-propionyl morpholine (NPM). The use of a combination of the described solvents may be required, for example for various industrial applications of PAI, where a viscosity within a specific range is desired. Further, the lower toxicity solvents of embodiments of the present invention can act as diluents in the polymer resin coating compositions. To achieve the coating compositions of embodiments of the present invention, a combination of dialkylamide solvents may be used to obtain the desired viscosity as well as other useful properties required for the optimized performance of the coating composition.

In a specific embodiment, the preferred molar ratio of aprotic dialkylamides is from about 19:1 to about 1:1. More preferred may be a ratio of from about 80:20 to about 70:30. Most preferred may be a ratio of about 78:22.

In addition to the aprotic dialkylamide solvents that are used in association with embodiments of the invention, either singly or in combination, co-solvents can be used. Preferred co-solvents that can be used either for the synthesis of, or as diluents for dissolution of PAI resins in coating compositions can include, but are not limited to, one or more of the following: water, o-xylene, triethylamine, dimethylethanolamine, morpholine, N-methylmorpholine, acetone, trimethylamine, tripropylamine, diethylamine, diisopropylamine, or caprolactam.

EXAMPLES

Example 1

1.78 grams of polyamideimide powder, with a 93.5% solids content (when dried at 200° C.), 0.492 grams of N-ethyl morpholine, and 7.728 grams of N-acetyl morpholine were combined in a vial and placed in an oven at 80° C. The PAI powder sample was completely dissolved and uniform after 5 hours. This resulting liquid coating composition material was used to make a film with good performance, to match a reference film, prepared with NMP, by FTIR.

Example 2

Three coating compositions were prepared using an equal weight solution of polyamideimide powder in reference solvents NMP and NEP and the inventive solvent NAM. Viscosities were measured. The data table demonstrates that a coating composition using a solvent of the invention is produced with a viscosity within a comparable acceptable range as prior art solvents.

Example 3

Two coating composition solutions were prepared by dissolving 24.06 w/w % of polyamideimide resin in NAM and a mixture of 90 w/w % NAM and 10 w/w % NEM. Solution viscosities were 9268 cps and 6638 cps, respectively. The data table demonstrates that coating composition using a solvent of the invention and a combination of solvents of the invention are produced with a viscosity within a comparable acceptable range as prior art solvents.

We claim:
1. A coating composition comprising:
at least one polyamideimide resin;
at least one aprotic dialkylamide solvent; and
at least one co-solvent, wherein the at least one co-solvent is selected from the group consisting of water, o-xylene, triethylamine, dimethylethanolamine, morpholine, N-methylmorpholine, acetone, trimethylamine, tripropylamine, diethylamine, diisopropylamine, and caprolactam.

2. The composition of claim 1, wherein the at least one aprotic dialkylamide solvent is N-acetyl morpholine.

3. The composition of claim 1, wherein the at least one aprotic dialkylamide solvent is diethyl acetamide.

4. The composition of claim 1, wherein the at least one aprotic dialkylamide solvent is di-N-propyl acetamide.

5. The composition of claim 1, wherein the at least one aprotic dialkylamide solvent is N-formyl morpholine.

6. The composition of claim 1, wherein the at least one aprotic dialkylamide solvent is diacetylpiperazine.

7. The composition of claim 1, wherein the at least one aprotic dialkylamide solvent is N,N-diisopropylacetamide.

8. The composition of claim 1, wherein the at least one aprotic dialkylamide solvent is di-N-butylacetamide.

9. The composition of claim 1, wherein the at least one aprotic dialkylamide solvent is di-N-propylacetamide.

10. The composition of claim 1, wherein the at least one aprotic dialkylamide solvent is N-propionyl morpholine.

\* \* \* \* \*